Figure 1:
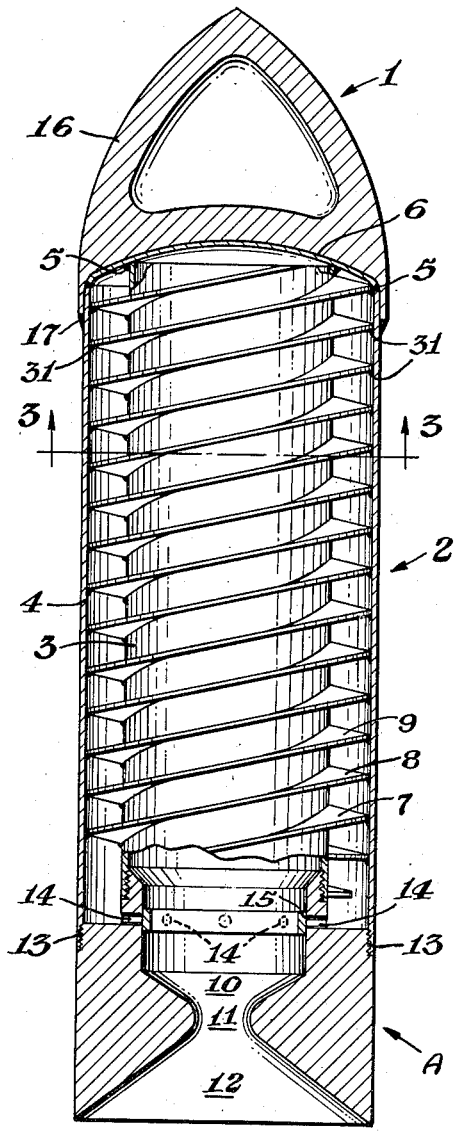

May 11, 1965  F. J. LOWES, JR  3,182,445
LIQUID-SOLID PROPELLANT ROCKET CASE AND METHOD
Filed Dec. 21, 1959  2 Sheets-Sheet 1

INVENTOR.
Fred J. Lowes, Jr.
BY
Griswold & Burdick
ATTORNEYS

May 11, 1965   F. J. LOWES, JR   3,182,445
LIQUID-SOLID PROPELLANT ROCKET CASE AND METHOD
Filed Dec. 21, 1959   2 Sheets-Sheet 2

INVENTOR.
Fred J. Lowes, Jr.
BY
Griswold & Burdick
ATTORNEYS

3,182,445
LIQUID-SOLID PROPELLANT ROCKET CASE AND METHOD

Fred J. Lowes, Jr., Midland, Mich., assignor to The Dow Chemical Company, Midland, Mich., a corporation of Delaware
Filed Dec. 21, 1959, Ser. No. 860,831
6 Claims. (Cl. 60—35.3)

The present invention relates to rockets and more particularly it concerns a new rocket structure and a new method of operation.

Solid propellant rocket cases conventionally comprise nose, chamber and nozzle sections. As the effective range and velocity of the rocket is directly affected by its weight, it is highly desirable to develop lighter and more effective case components. The rocket chamber section which contributes a substantial share of the total case weight provides great opportunity for improvement through design innovation. Also, there have been attempts in the past, to build a rocket case capable of conjunctively utilizing solid and fluid propellant ingredients. Usually, however, the inclusion within a rocket case of heavy pumping means and other necessary hardware needed for the control of the liquid ingredient has lessened the value of any improvements attributable to the use of the combined propellant system.

Therefore, it is desirable, as an object of the present invention, to provide an improved light weight rocket chamber section. Another object is to provide a rocket case capable of efficiently utilizing combined propellant systems which conjunctively employ solid and liquid ingredients. A further object of the present invention is to provide a new method for carrying out the combustion of propellant systems in the production of thrust. Other objects will become apparent hereinafter as the invention is more fully described.

The present invention provides a novel rocket case comprising a nose section, a chamber section and a nozzle section, wherein the chamber section comprises at least 2 concentric casings joined at their forward end to a suitable closure. The inner casing has reinforcing ribs rigidly secured to and circumscribing its peripheral surface. These ribs extend outwardly from the inner casing into the annulus defined by the inner and outer casings and are shaped, or adapted to permit fluid flow from the forward region of the annulus toward the rear of the annulus. The nozzle section is adapted for attachment to the chamber section by suitable connecting means and is constructed so as to cooperate with the inner casing chamber to provide a discharge nozzle therefor and to cooperate with the said concentric casings to provide a rear closure therefor, thereby completing the formation of an annular compartment. Discharge passages connect the rearward region of this annular compartment with the inner combustion chamber at or slightly upstream from the throat of the nozzle.

Additionally, the present invention provides a novel method of rocket operation wherein a solid propellant system which is deficient in a class of ingredients such as fuels or oxidants, is burned within an inner combustion chamber. A makeup propellant ingredient, or mixture of such ingredients, of the deficient class of ingredients is injected into the combustion product stream at the rearward region of the inner combustion chamber from another chamber, e.g., such as the annular compartment, surrounding the inner combustion chamber. Injection of such makeup propellant ingredients is accomplished, at least in part, by means of energy effects derivable from the combustion of the deficient propellant system within the inner combustion chamber.

Figure 2:
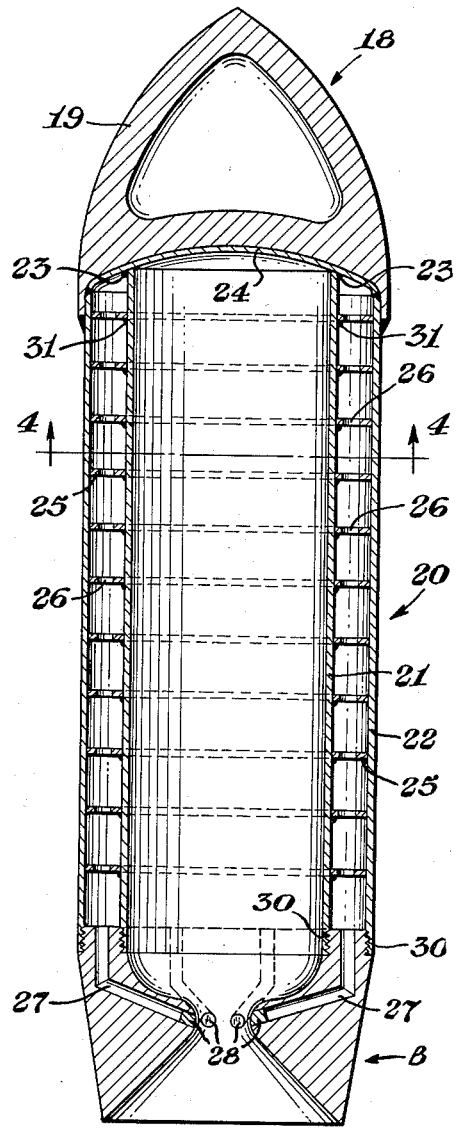
Figure 3:
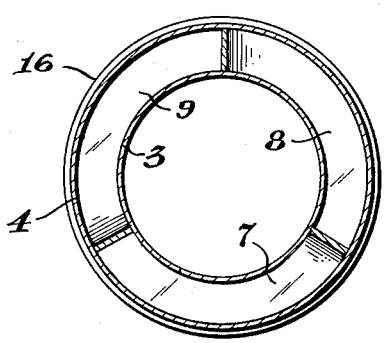
Figure 4:
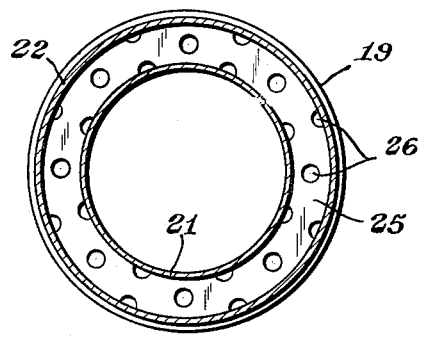
Figure 5:
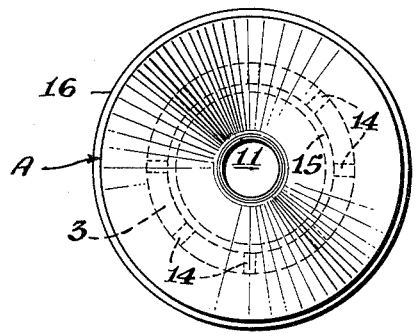
Figure 6:
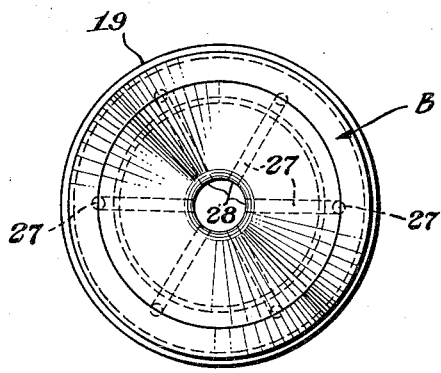

In the accompanying drawings, FIGURE 1 is a side elevational view of an assembled rocket case showing cut-away views of nozzle, chamber and nose sections. FIGURE 3 is a sectional view of the chamber section taken along the line 3—3 in FIGURE 1. FIGURE 5 is an end view of the nozzle section shown in FIGURE 1. FIGURE 2 is a side elevational view of a second embodiment of an assembled rocket case constructed in accordance with the present invention. It shows, in addition to the conventional nose section, cut-away views of optional construction in the nozzle and chamber sections. FIGURE 4 is a sectional view of the chamber section shown in FIGURE 2 taken along the line 4—4. FIGURE 6 is an end view of the nozzle section shown in FIGURE 2.

Shown in FIGURE 1 is a nose section 1, a chamber section 2 and a nozzle section A. The chamber section comprises an inner casing 3 and an outer casing 4. These casings are connected by suitable means such as the bead weld 5 shown, at their forward end to a suitable closing head 6 in a manner so as to independently seal both the annulus and the inner casing chamber. Particularly, FIGURE 1 shows a reinforced rocket chamber section having three reinforcing helical ribs 7, 8, 9 rigidly secured to both the inner casing 3 and the outer casing 4 as by the bead weld shown 31. These helical ribs begin at the forward closing head 6 and circumscribe the inner casing in the form of a helix until reaching a point at the rear of the annulus. Also, shown in FIGURE 1 is nozzle section A. This nozzle section has a conventionally streamlined constricting surface 10, a circular nozzle throat 11 and a diffusing cone 12. It is connected to the chamber section by suitable connecting means such as the threads 13 shown. Nozzle section A also provides a rear closure for the annulus so as to complete the formation of the annular compartment. The rearward region of this annular compartment is connected to the combustion zone within the inner casing and nozzle extension thereof by means of discharge passages 14 in the inner chamber wall. Such discharge passages are located in the inner chamber wall about its circumference in a manner so as to permit the passage of fluids into the combustion zone slightly upstream from the throat of the nozzle. These discharge passages may be optionally plugged by such means as the snugly fitting fusible ring 15 shown.

FIGURE 3, a sectional view taken at line 3—3 in FIGURE 1, illustrates the relative arrangement of the inner casing 3, the outer casing 4 and the annular helical ribs 7, 8, 9 which are rigidly attached to both casings. As shown, a concentric arrangement of circular casings is preferred but the invention is not limited to this configuration. Elliptical casings and off center variations in the alignment of the inner and outer casings are readily conceived.

FIGURE 5 is an end view of the nozzle section shown in FIGURE 1 showing a preferred arrangement of discharge passages 14 circumferentially located in the walls of the inner chamber at uniform intervals. Also shown is the fusible ring 15 which may be used to plug the discharge passages.

The nozzle section of the rocket is adapted to provide a nozzle discharge, i.e., it is shaped in a known fashion to provide a high velocity discharge of the combustion products produced within the combustion chamber. Although the rear annulus closure may be provided by alternative means independent of the nozzle section, the nozzle section is conveniently adapted to connect with the concentric casings so as to provide a rear closure for the annulus formed therefrom.

The nose section 1 is a conventional assembly including a nose cone 16 and necessary structural elements or means for housing the pay-load of the rocket. It joins the forward end of the chamber section by suitable connecting means such as the bead weld 17 shown so as to form a continuous shape. Other than to show a completely assembled rocket case and the relationship of the component parts thereof, the nose section and its contents are irrelevant to the present invention.

In the foregoing embodiment of the apparatus of the present invention, three helical ribs divide the annular compartment into a corresponding number of helical channel compartments. In practice, however, any convenient number of helical ribs can be employed. Prior to operation of the rocket, these channels provide storage space for one or more make-up propellant ingredients and during the operation of the rocket, they contain and direct the make-up propellant ingredients as they are utilized into the discharge passages. Such helical channels may be adjacent, as illustrated in FIGURE 1, i.e., circumscribing the same casing or they may be, by the interposition of additional casings, superimposed upon each other within 2 or more concentric annular compartments. Although the helical ribs may occupy the full radial distance of the annulus and be rigidly attached to each casing defining the annulus for increased strength, it is possible to employ ribs which are rigidly attached to the periphery of the inner casing only and which extend from the inner casing walls into the annulus for only a part of the full radial distance. In such instances, the annular compartment is a single continuous chamber about the inner casing. Generally, the number of turns of the helical ribs required to provide the necessary strength at the optimum total weight is a function of the physical characteristics of the materials of construction, the dimensions of the rocket case and the number of ribs employed.

As carried out in the above described structural embodiment of the present invention, the method of the present invention involves burning a solid propellant system, which is deficient in one class of its operative ingredients, such as the oxidants or fuels, within the inner combustion chamber, i.e., the inner casing chamber. A derived energy effect is utilized, either by itself or in conjunction with other means, to cause injection into the inner combustion chamber from the surrounding annular compartment, of an appropriate vaporizable makeup propellant ingredient of the class of ingredients in which the solid propellant system is deficient. The derived energy effect in this instance is heat of combustion transferred through the inner combustion chamber walls during the combustion of the deficient solid propellant system contained therein. Upon its absorption by the vaporizable makeup propellant ingredient contained within the annular compartment, or compartments, this heat is utilized to provide driving vapor pressure of the desired makeup ingredient. Other means referred to include the use of a low molecular weight gas, which is non-condensing at normal temperatures and pressures below about 1000 p.s.i.a., to prepressurize the contents of the annular compartment. When a total vapor pressure sufficient to overcome that within the inner combustion chamber at the point, or points, of injection is achieved, the gaseous makeup materials contained within the annular compartment pass through the discharge passages into the inner combustion chamber. Among the effects resulting upon contact of these makeup ingredients with the combustion products of the burning, deficient solid propellant system is an additional reaction providing energy for the production of thrust.

FIGURE 2 illustrates a side elevational view of a second embodiment of the present invention. As in FIGURE 1, there is also illustrated in this figure a nose section 18 having a nose cone 19 and a chamber section 20 having an inner casing 21 and an outer casing 22 concentrically arranged and joined by suitable means such as the bead weld 23 shown at their forward end to a suitable forward closure 24. However, in this embodiment, the reinforcing ribs for the inner casing are flat ring ribs 25 spaced at frequent intervals throughout the annulus. These flat ring ribs 25 circumscribe the inner casing and are rigidly attached to its peripheral surface as by the bead weld 31 shown. They may also be rigidly attached to the outer casing for the greater chamber wall strength achieved thereby, but such attachment is not required when operability is achieved at low annulus pressures. Such ribs are adapted by the provision of apertures 26 therein to permit the passage of fluids from the forward end toward the rear end, of the annular compartment.

The nozzle section shown in FIGURE 2, which is hereinafter referred to as nozzle section B provides a nozzle discharge for the inner casing chamber and a rear closure for the annulus defined by the concentric casings thereby completing the formation of an annular compartment. It may be joined to the chamber section as by the threaded sections 30 shown. Discharge passages 27 are provided in this nozzle section which pass through the nozzle section in a manner so as to connect the rearward region of the annular compartment with the combustion chamber near the throat of the nozzle. Shown in each of these discharge passages are optional fusible plugs 28.

FIGURE 4, a sectional view of the rocket chamber shown in FIGURE 2, taken along the line 4—4 shows the relative arrangement of the inner casing 21, outer casing 22 and flat ring ribs 25, the latter being provided with apertures 26 to permit fluid passage.

FIGURE 6 is an end view of nozzle section B showing a circumferential arrangement of discharge passages 27. Also shown are the corresponding optional fusible plugs 28. The required number of such passages connecting the annular compartment with the combustion chamber is determined by the desired rate of discharge and uniformity of injection about the circumference of the inner combustion chamber. These factors are, in turn, dependent upon such considerations as the physical and chemical characteristics of the makeup ingredients and fluid dynamics within the inner combustion chamber.

In connection with the optional configurations of the apparatus shown in FIGURE 2, particularly nozzle section B, as employed in the method of the present invention, a second derived energy effect for accomplishing injection of a makeup ingredient from the surrounding annular compartment into the combustion zone near the nozzle throat, involves the high velocity discharge gases at this point. These high velocity gases are capable of providing an aspirating effect which permits injection of fluid makeup propellant ingredients into the combustion product stream at substantially reduced annulus pressures.

Although fabrication considerations such as would be apparent to one skilled in the art may suggest the use of specific materials of construction for the rocket case, there are no special requirements for construction materials employed in the fabrication of the present invention arising from the uniqueness of the invention itself. Generally, it is desirable to employ light weight high strength aluminum, magnesium and titanium based alloys. Stainless steels are also useful since a smaller volume of such metals is required for equivalent strength. Rocket cases, or more particularly rocket chamber and nozzle sections constructed in accordance with the present invention, can be made in any size necessary to accomplish the purpose for which it will be employed.

In the foregoing description of the apparatus of the present invention and optional modifications thereof, brief mention was made of the method of operation for the particular embodiment involved. Generally, in the operation of the present invention, injection of the makeup propellant ingredient into the combustion product stream can be accomplished by one or a combination of means which include the gaseous pressurization of the makeup ingredient by heat of combustion transferred through the inner chamber walls, the venturi or aspirating effect derived from the high velocity combustion product stream near the throat of the nozzle and/or prepressurization of fluid ingredients within the annular compartment with a non-condensing gas. The aforementioned nozzle sections A and B represent variations in apparatus required for the accommodation of the foregoing methods of operation. Which of these nozzle sections, A or B, is employed in the rocket is determined by the chemical nature of the reaction between the makeup propellant ingredient and the combustion products produced from a deficient solid propellant system within the inner combustion chamber.

The solid propellant grain contained within the inner combustion chamber is formulated so as to be deficient in a certain class of ingredients such as, for example, the fuels or oxidants. The makeup propellant ingredient, which may be a gas, liquid or vaporizable solid, is capable of providing material of the class in which the solid propellant system is deficient. Thus, upon contacting the combustion products of the deficient solid propellant, the makeup propellant ingredients provide an additional reaction from which additional energy for the production of thrust is derived. For example, these additional reactions include the further oxidation of underoxidized combustion products or the adding of a fuel component to overoxidized combustion products.

If the reaction between the makeup ingredient and solid combustion products proceeds at a relatively low rate on the order of a deflagration-type reaction, the makeup material is employed in conjunction with a nozzle section similar to nozzle section A. In such a case, the makeup propellant ingredient is injected into the combustion products upstream from the throat of the nozzle a sufficient distance to provide a period of time for completion of the reaction within the rocket motor. However, if the reaction between the makeup propellant ingredient and the combustion products is a detonation-type reaction, the makeup propellant ingredient is injected into the combustion product stream at the throat of the nozzle as with nozzle section B where the instantaneous reaction is capable of providing additional thrust without destroying the rocket. For reaction rates varying between these extremes, suitable injection points are selected at intermediate points in the combustion product stream so as to provide adequate reaction times within the rocket motor.

To accomplish injection into the high pressure zone, i.e., upstream from the throat within the inner casing as illustrated in FIGURE 1, a makeup ingredient must be supplied under a pressure greater than the combustion chamber pressure. In present rocket motor designs such pressures may range from 300 to 500 pounds per square inch absolute while projected combustion chamber pressures are contemplated as great as 1000 pounds per square inch absolute. However, whenever it is possible by virtue of the nature of the reactivity of the makeup ingredients with the deficient solid propellant combustion products, to inject such makeup ingredient at or near the throat of the nozzle, the aspirating effect of the high velocity product stream at this point substantially reduces the operating pressure required within the annular compartment.

Primary solid propellant systems, i.e., the propellant to be contained within the inner casing combustion chamber, to be employed in the present invention include under- or over-oxidized conventional propellant systems. Also operable are propellant systems which contain an ingredient capable of being vaporized or thermally decomposed upon combustion of the primary solid propellant and finally reacted with an appropriate fuel or oxidant makeup component supplied from an annular compartment.

Exemplary fuels for these composite solid propellant systems include such materials as asphalt oils; cellulosic derivatives, e.g., nitrocellulose, cellulose acetate and ethyl cellulose; synthetic resins, e.g., phenolformaldehyde, urea-formaldehyde, acrylates, polystyrene and polyurethane; elastomers, e.g., Buna rubbers, neoprene and butyl rubber; and polyesters such as the condensation products of acids such as maleic, adipic and phthalic and glycols such as diethylene and dipropylene.

Oxidizers which may be employed for such fuels include sodium nitrate, potassium nitrate, ammonium nitrate, potassium perchlorate, ammonium perchlorate and lithium perchlorate. In addition to the foregoing fuel and oxidizer components, other additives frequently employed in composite solid propellant systems for specific effects include certain antioxidants, accelerators, catalysts, extenders, reinforcing agents and fillers.

Composite solid propellant systems to be employed in the present invention are formulated in the same manner as for other rockets except that one or more of the ingredients belonging to either the oxidizer or fuel classes of ingredients are provided in less than an amount required for optimum operation. A makeup material of the deficient class of ingredients is supplied from the annular compartment in the manner of the foregoing method. Generally, in order to provide sufficient heat at the inner casing walls for vaporization of the makeup ingredient contained within the annular compartment, the solid propellant grain should be adapted to provide some end and/or external burning.

Makeup propellant ingredients to be reacted with the combustion products of the deficient solid propellant systems must be at least potentially fluid to be operative. Gaseous and liquid materials are capable of being prepressurized under their own vapor pressure or that of a compatible gas such as helium. Hydrogen is also useful for this purpose if it is inert to the makeup material. Although prepressurization is not necessary, it may be used in conjunction with the vapor pressure of makeup propellant ingredients produced by the thermal energy absorbed from the inner casing walls during the combustion of the deficient solid propellant system within the inner casing chamber. Of course, during the storage of such gaseous or liquid makeup materials, the discharge passages must be plugged with fusible or combustible materials such as magnesium, aluminum or polymeric materials which melt and burn immediately after ignition of the rocket motor. Exemplary shapes of fusible plugs are shown in FIGURES 1 and 2.

Whenever a liquid makeup propellant ingredient is employed in the annular compartment, it is preferably stabilized as a gel in order to avoid the unstable influence of a completely mobile liquid. To be operable in such an application, the gelling agent would necessarily have to be chemically inert to the makeup ingredient at normal storage temperatures.

Solid makeup propellant ingredients which vaporize or thermally decompose to provide gaseous materials upon the application of heat at temperatures achieved during the operation of the rocket are also operable.

Exemplary makeup materials for oxidant-deficient systems include in addition to the above mentioned vaporizable solid oxidants, hydrogen peroxide, red fuming nitric acid, nitrogen tetroxide, nitric oxide, chlorine trifluoride, bromine pentafluoride and the like. Exemplary makeup ingredients for fuel-deficient systems include ammonia, hydrazine, lithium hydride, diborane, pentaborane, kerosene, aniline, ethyl alcohol and the like. Other makeup ingredients may comprise certain mono-propellants such as nitroglycerin, nitromethane, ethyl nitrate, diethylene glycol dinitrate and the like.

Beneficial results are obtained in the practice of the present invention employing the above described rocket case apparatus and method when the inner combustion chamber contains a deficient solid propellant grain adapted for end burning, which comprises the principal ingredients of ammonium perchlorate as the oxidizer and a polyurethane as the fuel component, with such propellant system containing less than a stoichiometric quantity of the oxidizer. After ignition of the under-oxidized composite solid propellant grain, heat normally lost through the combustion chamber walls is absorbed by the makeup ammonium perchlorate contained within the annular compartment thereby vaporizing the same. As this oxidizer is vaporized, thermal expansion of the gases forces a portion of the gaseous material through the discharge passages and into the combustion zone upstream from the nozzle throat. Upon contact with the additional oxidizer, the combustion products are further reacted and the energy so-produced is available for conversion with the rocket motor into kinetic energy.

Initially, the ignition system of the solid propellant within the inner casing and some portion of the solid propellant itself are formulated so as to be fully reacted. By this means, optimum operation is maintained during the interval of time between the starting of the combustion reaction and the point thereafter at which a fusible plug, if such was employed, has been melted and at which sufficient vapor pressure has been built up to overcome the combustion chamber pressure.

A rocket case constructed in the manner of the present invention most advantageously utilizes the hoop strength of one or more ribs to reinforce the combustion chamber. Furthermore, in the method of the present invention involving the utilization of makeup ingredients contained within the annular compartment, or compartments, a means is provided whereby such ingredients are preheated before injection into the combustion zone while at the same time cooling the combustion chamber walls. Thus, heat energy ordinarily lost through combustion walls is absorbed and returned to the rocket motor for conversion to kinetic energy while the metal walls of the combustion chamber have increased operational strength due to their lower temperature. The combined result, therefore, presents a more efficient rocket apparatus capable of achieving a very high strength per weight ratio and employing both liquid and solid propellant ingredients with a minimum of rocket hardware.

It is clear from the foregoing description of the present invention that various modifications may be made in the apparatus and method of operation as described above without departing from the spirit and scope thereof. It should be understood that the present invention is limited only as defined in the claims.

I claim:

1. A rocket case comprising a nose section, a chamber section and a nozzle section wherein the chamber section comprises concentric casings joined at their forward end to a suitable closure and reinforcing ribs rigidly secured to and circumscribing the peripheral surface of the inner casing, such ribs being extended outwardly from said inner casing into the annulus defined by the inner and outer casings and permitting fluid flow from the forward region of the annulus toward its rearward region and wherein the nozzle section cooperates with the inner casing chamber to provide a discharge nozzle therefor and cooperates with said concentric casings to provide a rear closure for said annulus thereby completing the formation of an annular compartment, said annular compartment being connected to an inner combustion chamber formed by said inner casing chamber and nozzle extension thereof by suitable rearwardly located discharge passages.

2. A rocket case comprising a nose section, a chamber section and a nozzle section wherein the chamber section comprises two concentric casings joined at their forward end to a suitable closure and reinforcing ribs circumscribing the inner casing which are rigidly secured to both the outer wall of the inner casing and the inner wall of the outer casing, such ribs permitting fluid flow from the forward region of the annulus toward its rearward region, and wherein the nozzle section cooperates with the inner casing chamber to provide a discharge nozzle therefor and cooperates with said concentric casings to provide a rear closure for the annulus so defined thereby completing the formation of an annular compartment, said annular compartment being connected to an inner combustion chamber formed by said inner casing chamber and nozzle extension thereof by suitable discharge passages located in the inner chamber wall so as to discharge into the combustion product stream at points slightly upstream from the nozzle throat.

3. A rocket case comprising a nose section, a chamber section and a nozzle section wherein the chamber section comprises two concentric casings joined at their forward end to a suitable closure and reinforcing ribs circumscribing the inner casing which are rigidly secured to both the outer wall of the inner casing and the inner wall of the outer casing, such ribs permitting fluid flow from the forward region of the annulus toward its rearward region and wherein the nozzle section cooperates with the inner casing chamber to provide a discharge nozzle therefor and cooperates with the said concentric casings to provide a rear closure for the annulus so defined thereby completing the formation of an annular compartment, said annular compartment being connected to an inner combustion chamber formed by said inner casing chamber and nozzle extension thereof by suitable discharge passages located in said nozzle section so as to discharge into the combustion product stream at points near the nozzle throat.

4. In a process for the production of thrust involving burning a solid propellant system within an inner combustion chamber of a rocket, the improvement which consists in burning a solid propellant system deficient in a vaporizable makeup propellant ingredient contained in an annular compartment surrounding the inner combustion chamber and simultaneously therewith injecting the vaporizable makeup propellant ingredient in vapor form into the exhaust gases of the solid propellant system in the high velocity region of the nozzle throat, such injection of the makeup propellant ingredient being accomplished at least in part by vapor pressure generated by heat absorbed in the makeup propellant ingredient from the inner combustion chamber walls.

5. A process as in claim 4 wherein injection of the makeup propellant ingredient is facilitated by injecting the makeup propellant ingredient vapors into the high velocity gases at the throat of the nozzle so as to achieve an aspirating effect.

6. A process as in claim 5 wherein the makeup propellant ingredient is a fluid maintained under a high gas pressure.

References Cited by the Examiner

UNITED STATES PATENTS

| | | | |
|---|---|---|---|
| 916,726 | 3/09 | Lake | 60—35.6 |
| 1,405,482 | 2/22 | Bostedo | 60—35.3 |
| 1,983,405 | 12/34 | Schmidt | 60—35.3 |
| 2,359,108 | 9/44 | Hoskins | 60—39.58 |
| 2,419,866 | 4/47 | Wilson | 60—35.6 |
| 2,434,298 | 1/48 | Truax | 60—35.6 |
| 2,522,113 | 9/50 | Goddard | 60—35.6 |
| 2,671,312 | 3/54 | Roy | 60—35.6 |
| 2,686,400 | 8/54 | Andrus | 60—35.6 |
| 2,753,801 | 7/56 | Cumming | 60—35.6 |
| 2,984,973 | 5/61 | Stegelman | 60—39.48 |
| 3,017,748 | 1/62 | Burnside | 60—39.48 |
| 3,034,289 | 5/62 | Stott et al. | 60—26.1 |

FOREIGN PATENTS

| | | |
|---|---|---|
| 477,022 | 6/15 | France. |
| 166,258 | 7/21 | Great Britain. |
| 590,177 | 7/47 | Great Britain. |

SAMUEL LEVINE, *Primary Examiner.*

SAMUEL FEINBERG, ABRAM BLUM, *Examiners.*